(12) United States Patent
Herman

(10) Patent No.: US 10,896,335 B2
(45) Date of Patent: Jan. 19, 2021

(54) ADAPTIVE TRANSPARENCY OF VIRTUAL VEHICLE IN SIMULATED IMAGING SYSTEM

(71) Applicant: FORD GLOBAL TECHNOLOGIES, LLC, Dearborn, MI (US)

(72) Inventor: David M. Herman, Oak Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

(21) Appl. No.: 16/240,961

(22) Filed: Jan. 7, 2019

(65) Prior Publication Data

US 2020/0218910 A1    Jul. 9, 2020

(51) Int. Cl.
*G06K 9/00* (2006.01)
*G06T 7/73* (2017.01)
(Continued)

(52) U.S. Cl.
CPC .......... *G06K 9/00805* (2013.01); *B60R 11/04* (2013.01); *G06K 9/00369* (2013.01);
(Continued)

(58) Field of Classification Search
CPC .......... G06K 9/00805; G06K 9/00369; G06K 9/00671; G06K 9/00798; G06T 7/215; G06T 7/73; G06T 2207/30252; G06T 17/20; B60R 11/04; B60R 1/00; B60R 2300/605; B60R 2300/207; B60R 2300/303; B60R 2300/8006; H04N 7/181; H04N 5/23216; H04N 5/247; H04N 5/23238; H04N 13/111; H04N 7/18;
(Continued)

(56) References Cited

U.S. PATENT DOCUMENTS 9,738,224 B2    8/2017 Gieseke et al.
9,743,002 B2    8/2017 Wierich
(Continued)

FOREIGN PATENT DOCUMENTS

WO    2018012299 A1    1/2018

OTHER PUBLICATIONS

Susumu Tachi, et al, Augmented Reality Helps Drivers See Around Blind Spots, IEEE Spectrum, pp. 1-5, Oct. 31, 2014.

*Primary Examiner* — Jianxun Yang
(74) *Attorney, Agent, or Firm* — Frank L. Lollo; MacMillan, Sobanski & Todd, LLC

(57) ABSTRACT

A visual scene around a vehicle is displayed to an occupant of the vehicle on a display panel as a virtual three-dimensional image from an adjustable point of view outside the vehicle. A simulated image is assembled corresponding to a selected vantage point on an imaginary parabolic surface outside the vehicle from exterior image data and a virtual vehicle image superimposed on a part of the image data. Objects are detected at respective locations around the vehicle subject to potential impact. An obstruction ratio is quantified for a detected object having corresponding image data in the simulated image obscured by the vehicle image. When the detected object has an obstruction ratio above an obstruction threshold, a corresponding bounding zone of the vehicle image is rendered at least partially transparent in the simulated image to unobscure the corresponding image data.

20 Claims, 8 Drawing Sheets

(51) Int. Cl.
*G06T 7/215* (2017.01)
*B60R 11/04* (2006.01)

(52) U.S. Cl.
CPC .......... *G06K 9/00671* (2013.01); *G06T 7/215* (2017.01); *G06T 7/73* (2017.01)

(58) Field of Classification Search
CPC ............... G05D 1/0221; G05D 1/0246; G05D 2201/0213; G06N 3/08; G06N 3/0454
See application file for complete search history.

(56) References Cited

U.S. PATENT DOCUMENTS

| | | | |
|---|---|---|---|
| 9,762,880 B2 | 9/2017 | Pflug | |
| 10,055,643 B2 | 8/2018 | Molin et al. | |
| 2015/0042799 A1* | 2/2015 | Zhang | H04N 7/18 348/148 |
| 2016/0182823 A1* | 6/2016 | Murasumi | B60R 1/00 348/38 |
| 2019/0026557 A1* | 1/2019 | Watanabe | G06K 9/00791 |
| 2020/0117916 A1* | 4/2020 | Liu | G05D 1/0221 |

* cited by examiner

| Object Class | Pixel Blockage Threshold (%) | Path Length to Show (sec of motion) | Priority For Shifting FOV | Highlight Pixel Cutoff |
|---|---|---|---|---|
| Pedestrian- Adult | 70 | 5 | 5 | 200 |
| Pedestrian-Child | 40 | 6 | 9 | 100 |
| bicycle | 50 | 4 | 7 | 300 |
| motorcycle | 60 | 3 | 6 | 300 |
| car | 70 | 3 | 5 | 300 |

ADAPTIVE TRANSPARENCY OF VIRTUAL VEHICLE IN SIMULATED IMAGING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to in-vehicle display or remote monitoring of a virtual scene surrounding a motor vehicle, and, more specifically, to displaying an outside surround view including a virtual representation of the vehicle itself.

Surround view camera systems are known in the art for providing a driver of a vehicle with a synthesized view of the environment and objects around a motor vehicle from the perspective of a viewpoint which is outside the vehicle. To provide realism, a virtual image of the vehicle itself is added to the synthesized view. The driver can typically select from viewpoints (or viewpoints may be automatically selected) at locations ranging 360° around the vehicle and usually at a height at or above the height of the vehicle. The resulting movable, simulated image provides both entertainment value and a situational awareness capability for enhanced safety.

Surround view camera systems use vehicle-mounted cameras to collect outward-looking images along each side of a vehicle. Based on the selected viewpoint, a display image is stitched together from the camera images and placed on a virtual envelope. A 3D model representing the appearance and geometry of the vehicle is stored according to the appearance of the vehicle as it would be seen from each of the possible viewpoints, e.g. an isometric viewpoint. The vehicle 3D model is placed at the appropriate position so that the simulated image accurately shows the relationship of the vehicle to the environment and nearby objects based on the stitched image envelope surrounding the 3D model of the vehicle. Thereafter, a virtual camera may be placed within the scene to provide a view to the vehicle occupant or remote viewer such as a remote autonomous vehicle takeover interface.

A potential problem with the simulated view is that the virtual car image is opaque and may interfere with detection of pedestrians, objects, and other vehicles on the other side of the virtual car. Such objects would be seen in the original camera data but become blocked by placement of the virtual car onto the image. Thus, the ability to track such objects from the simulated image display alone may be difficult when such object is obscured.

SUMMARY OF THE INVENTION

The invention maintains visibility of certain "blocked" objects that would be otherwise obscured by placement of the virtual car onto a simulated image. Pedestrians, cars, and other potentially hazardous objects are detected using well-known object detection methods (e.g., neural network computer vision algorithms, sometimes referred to as semantic segmentation) using analysis of camera images and/or based on other remote sensing technologies such as radar and ultrasonic detectors.

Detected objects are classified according to type of object, relative movement, and possibility of impact. Objects which are moving or have a possibility of starting to move may be treated as an increased hazard (e.g., by detecting significant translation of a pixel region centroid of the object from frame to frame, and/or using sensor fusion). Additional computer vision algorithms (conventional or neural network algorithms) can be used to detect features which heighten potential impact of an object (e.g., detecting a nearby car with its reverse lights on). The object classification itself can indicate an increased hazard class (e.g., a pedestrian detected as a child instead of an adult). The host vehicle may also predict possible future motion of the host vehicle itself based on steering angle, gear engaged, and other factors. Furthermore, the intersection of object(s) with host vehicle future motion trajectories may be estimated as well. Such factors may then be used to determine when to modify the displayed view.

For each object of interest, a determination is made whether the pixels corresponding to the object which are mapped onto a projection surface for creating a surround view transformation would be visible or blocked after placement of the virtual car onto the image. The extent of overall blockage for a blocked object is evaluated. This may include an identification of pixels of the virtual car that intersect with a ray traced from the selected viewpoint to the pixels of the object, for example. This evaluation may be based on total count of pixel obstruction, percentage obstruction, or some other method (e.g., use of a convolutional neural network to to "replicate" human perception and object recognition to validate if object is recognized with some amount of occlusion). The intersected pixels of the virtual vehicle image are modified to provide an altered transparency at or near the obscured object. A wireframe or subdued representation of the car may still be visible after applying the transparency. The level of detail of the transparent section of the virtual vehicle may be altered depending on size of the transparent section (e.g., the percentage of the virtual car's surface which is intersected).

The decision whether to make a portion of the vehicle model transparent may also depend upon the visibility or perceptibility of the portion of an object which is unblocked by the vehicle model. For example, a pedestrian may be half obscured, but given the contrast difference between the, person's clothing and the image background (e.g., tone, hue, texture, etc.,) the pedestrian may or may not be easily perceivable. In this embodiment, when a person's upper half is less visible in terms of contrast then the vehicle model is rendered with a corresponding transparent section, but if it is highly contrastive to the background then there would be no transparency.

Other modifications to, or overlays on, the simulated image can be employed in particular circumstances. For example, when an obscured object has a small size, a highlight frame can be placed around the object in the image to improve recognition. Another example addresses the situation where a person wearing light colors could appear behind a silver vehicle so that the colors blend together. A comparison of the color (hue, saturation, intensity) and intensity gradients can be used to detect a lack of contrast. In response to the lack of contrast, a highlight frame or border can again be placed around the object. Another example would be to create a depth of field effect wherein portions of the rendered scene appear in focus while other parts appear out of focus. This effect may be used to highlight objects in the scene.

The invention preferably monitors motion of the objects of interest and evaluates the probability of impacts of the objects with the vehicle. When there is significant relative motion, then the transparent section of the virtual vehicle image can be expanded to reveal the motion path of the object. When the probability of an impact becomes high, then the viewpoint (i.e., virtual camera position and perspective) can be alerted to a location when the moving object and its motion path are more directly visible. In other cases, the host vehicle's own present or expected motion may result in a hazard. Similarly, portions of the virtual vehicle may be made transparent to bring into better view nearby objects, present wheel angles, or virtual path lines which may be augmented in the image as a guide to the driver. In another example, the virtual camera view may show future path lines of objects based on current relative motion, such as the expected path of vehicle, in order to guide the user. Such object path lines may similarly be blocked by the virtual 3D model of the host vehicle. In such cases, portions of the host vehicle 3D model may be made transparent to maintain the visibility of such lines.

In one preferred aspect of the invention, a method is provided for displaying a visual scene around a vehicle to an occupant of the vehicle. A simulated image is assembled corresponding to a selected vantage point on an imaginary parabolic surface outside the vehicle from exterior image data and a virtual vehicle image superimposed on a part of the image data. Objects are detected at respective locations around the vehicle that may be subject to a potential impact. An obstruction ratio is quantified for a detected object having corresponding image data in the simulated image obscured by the vehicle image. When the detected object has an obstruction ratio above a calculated obstruction importance threshold, a corresponding bounding zone of the vehicle image is rendered at least partially transparent in the simulated image to unobscure the corresponding image data.

DETAILED DESCRIPTION OF PREFERRED EMBODIMENTS

Figure 1:
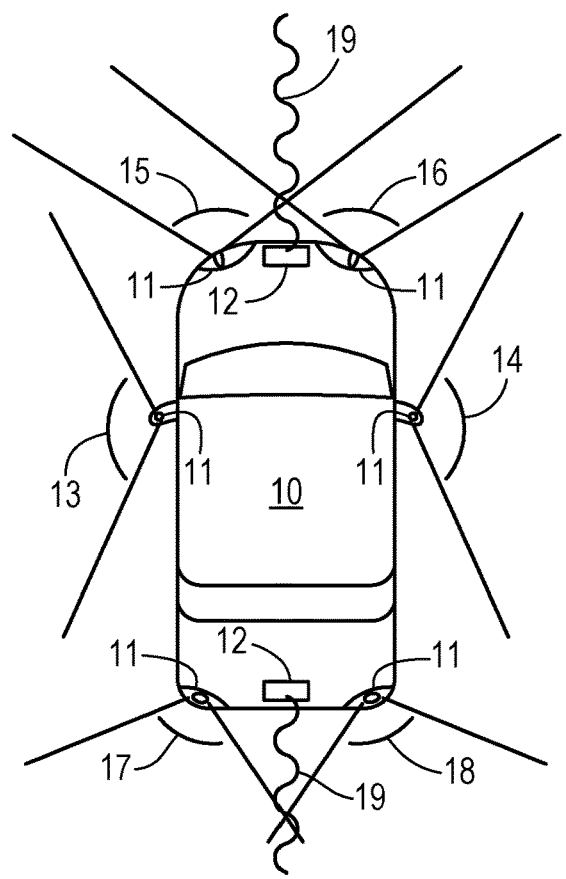
FIG. 1 is a top plan view of a vehicle showing cameras and remote sensors with corresponding fields of view and detection areas.

Referring to FIG. 1, a vehicle 10 (such as a passenger car) has an array of cameras comprised of cameras 11 mounted at various points around the perimeter of vehicle 10. Cameras 11 may be integrated into the side view mirror assemblies and/or the front and rear exterior lighting units, for example. Cameras 11 provide respective fields of view 13-18, resulting in outward-looking, exterior image data surrounding vehicle 10 with full coverage over 360°. Vehicle 10 also has various active remote sensors, such as front and rear radar units 12 which transmit and receive radar signals 19 for detecting and classifying nearby objects. Other active sensors include ultrasonic and laser sensors, all of which are used in the art of motor vehicles for obstacle detection, adaptive cruise control, lane tracking, parking assistance, and other advanced features. Such sensors, specifically their output or fusion thereof, may be used to further augment the virtual view by displaying indications of hazards, such as proximity. These indications may similarly become occluded by the position of the virtual vehicle model and the respective camera field of view.

Figure 2:
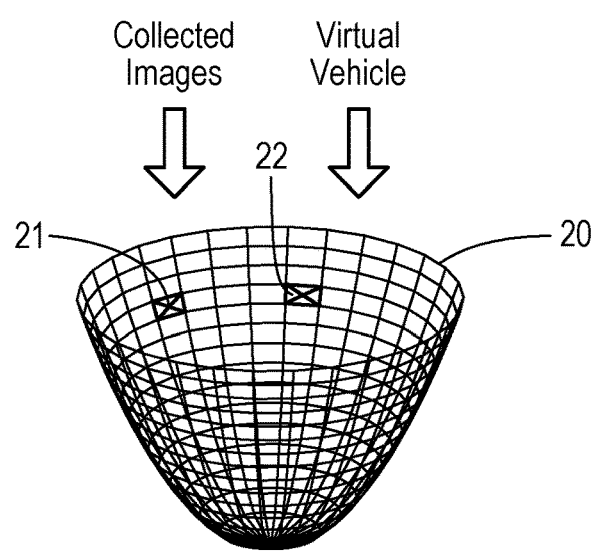
FIG. 2 is a diagram showing a parabolic surface used for projecting camera images and defining corresponding viewpoints.
Figure 3:
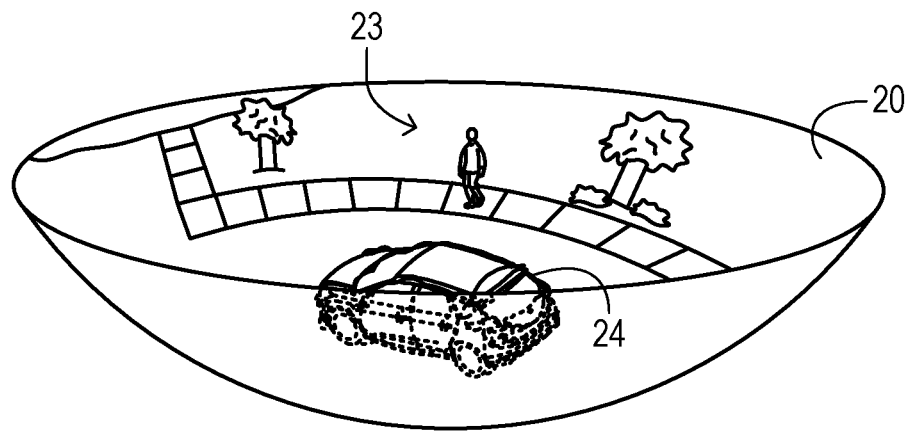
FIG. 3 is a perspective view of an imaginary parabolic surface having projected two-dimensional images and a virtual vehicle image from which simulated surround images are derived.

FIG. 2 shows an imaginary parabolic surface 20 which is represented digitally in an image processor or controller for synthesizing simulated three-dimensional views from the two-dimensional image data from the cameras. Collected images from the cameras are processed and then projected onto respective portions of parabolic surface 20. Examples of image processing include distortion correction, normalization of white balance across cameras, vignetting correction, and other single camera and multiple camera computer vision algorithms to improve the projected image. Various virtual vantage points 21 and 22 can be selected in order to provide a viewpoint for corresponding three-dimensional simulated images for display to a driver of the vehicle. In order to provide context in the simulated images, a virtual vehicle representation is also placed upon parabolic surface 20 at the vertex. More specifically, FIG. 3 shows parabolic surface 20 with outward-looking image data 23 stitched onto surface 20 using the image data collected from the cameras, which all share the vantage point of the actual vehicle. In the virtual representation being assembled from the projected camera data, a virtual vehicle image 24 is virtually placed at the vertex of parabolic surface 20 matching the orientation of the actual vehicle relative to the camera data. Any desired point on surface 20 can be selected as a vantage point for generating a simulated image representing a "bird's eye view" or isometric of the vehicle and the surrounding scene including objects nearby the vehicle.

Figure 4:
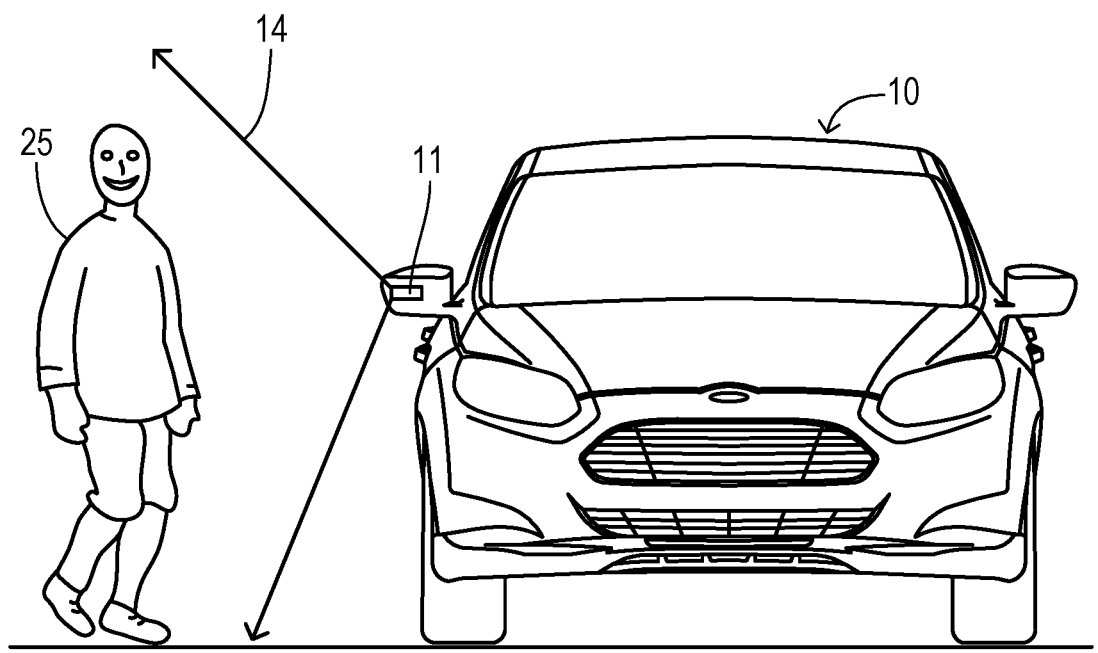
FIG. 4 is a diagram showing a person near a vehicle, wherein an outward looking camera on the vehicle has a field of view fully encompassing the person.
Figure 5:
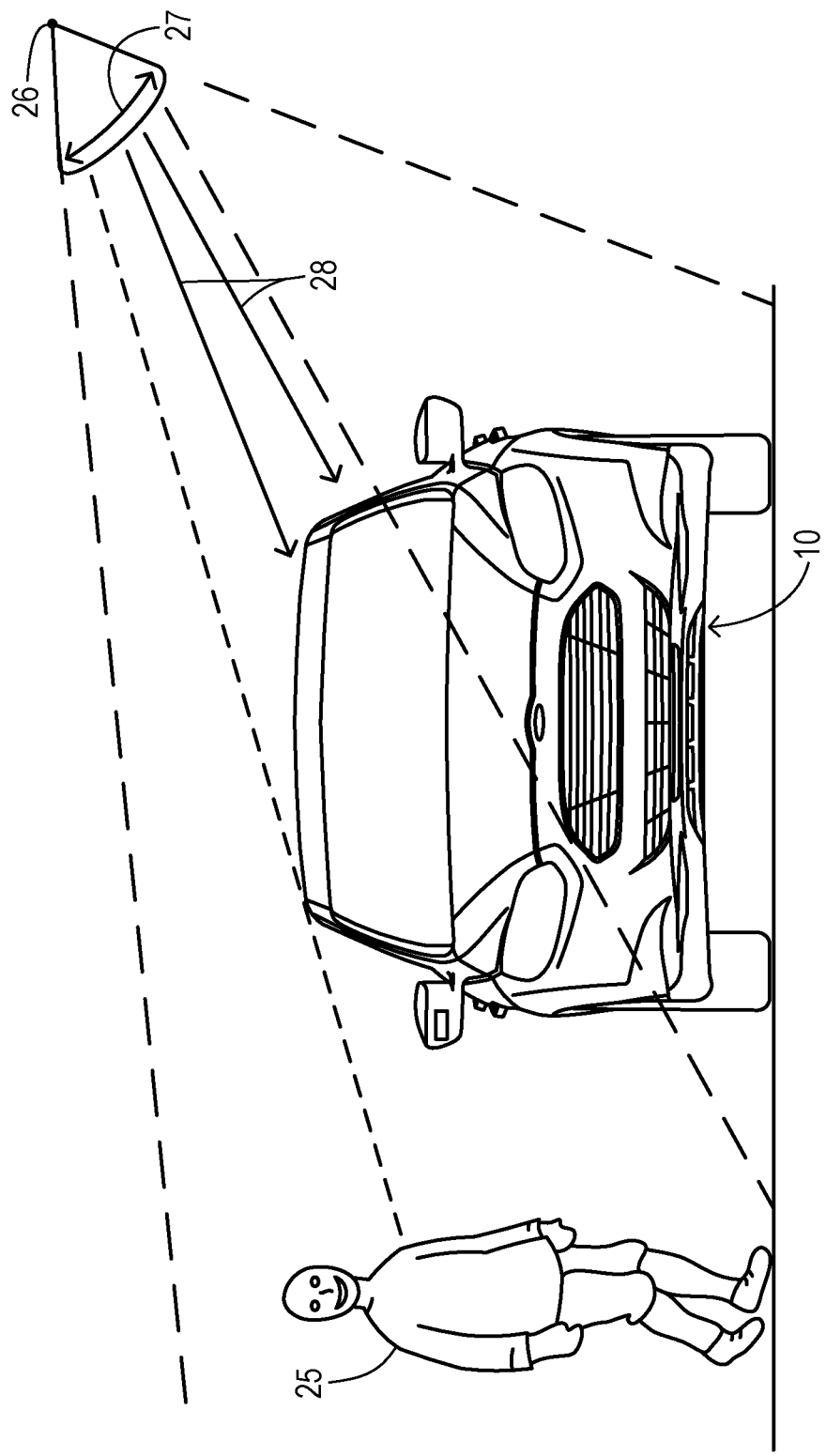
FIG. 5 is a diagram showing a viewpoint outside the vehicle for generating a simulated image wherein a large percentage of the person becomes obscured by the insertion of the virtual vehicle image.

As shown in FIG. 4, a camera 11 on vehicle 10 with the field of view 14 captures images of nearby object 25 (in this example, a person or pedestrian) and a surrounding scene or backdrop. Person 25 falls completely within field of view 14. Nevertheless, a simulated image may be generated from a vantage point from which at least a portion of person 25 would be obscured. For example, FIG. 5 shows a vantage point 26 that can be used to generate a simulated image having a field of view 27. Due to the relative placement of vehicle 10, person 25, and vantage point 26, a main portion of person 25 is obscured from the vantage point 26. For example, rays (i.e., sight-lines) 28 extending from vantage point 26 to person 25 intersect with vehicle 10, and due to the opacity of vehicle 10 an image of person 25 is blocked from the simulated image being generated for vantage point 26.

Figure 6:
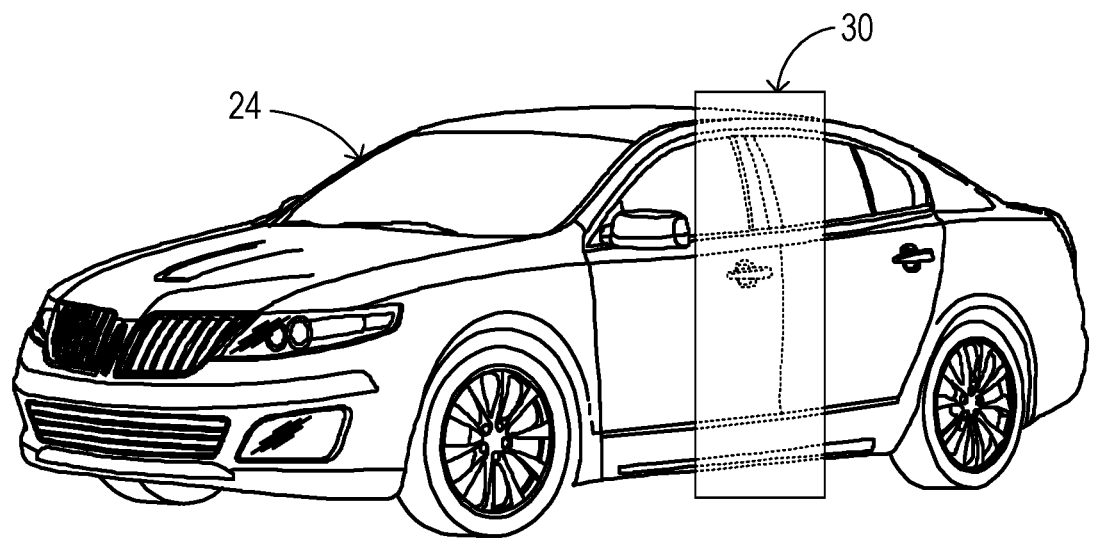
FIG. 6 is a virtual vehicle image within which a zone has been rendered transparent.
Figure 7:
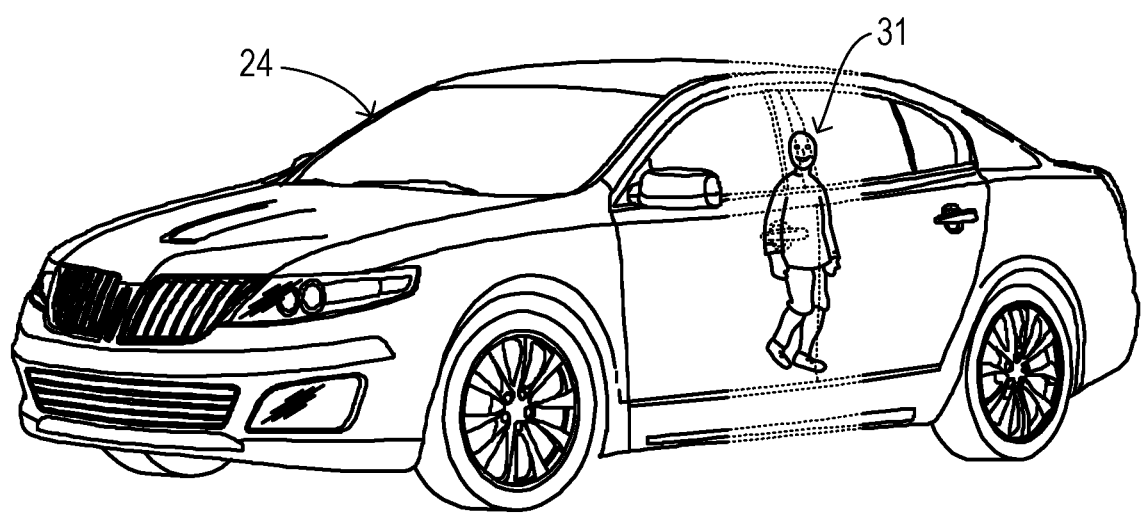
FIG. 7 shows the virtual vehicle image of FIG. 6 with an object appearing in the transparent zone.

FIG. 6 shows a virtual vehicle image 24 wherein a section 30 of vehicle image 24 is rendered transparent. A bounding zone 30 is intersected with vehicle image 24 at an appropriate size and location to unobscure an object of interest located behind vehicle image 24 in a simulated display for the driver. FIG. 7 shows an object of interest 31 as seen within the stitched-together exterior image data from the cameras. Object 31 in this example is a child who becomes visible by virtue of the addition of the transparent or at least partially transparent section of vehicle image 24. For good visibility, bounding zone 30 may include a full vertical stripe spanning vehicle image 24 and having a width slightly greater than the width of object 31. In the transparency, certain features such as the edges of vehicle structures may still be seen within vehicle image 24 with a subdued appearance. In some embodiments, the transparency effect may be obtained by generating an exploded view of the vehicle.

Figure 8:
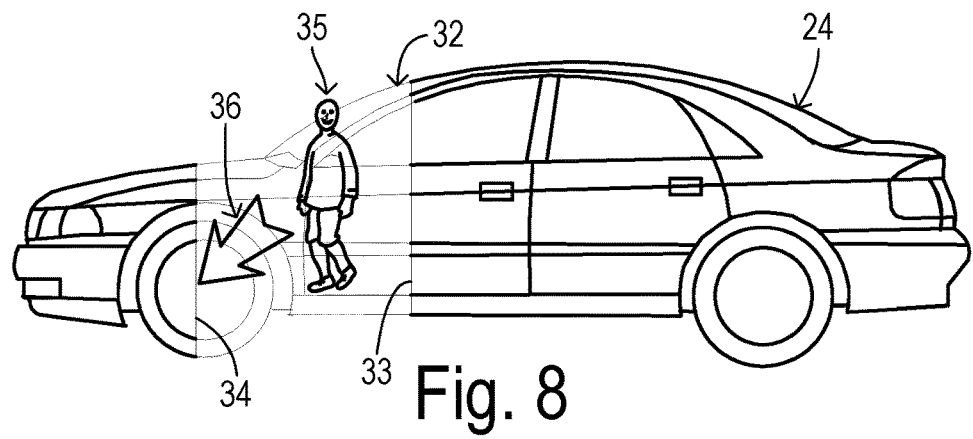
FIG. 8 is another virtual vehicle image wherein a transparent zone is enlarged to show an object with its motion path.

As shown in FIG. 8, the present invention may include monitoring of a relative motion between the vehicle and an object of interest in order to convey to the driver a direction and path of ongoing motion. Thus, an object of interest 35 shown as a pedestrian is bounded by an expanded bounding zone 32 wherein the transparency unobscures not only pedestrian 35 but also a motion path being followed by pedestrian 35. Preferably, a path indicator 36 may also be overlain onto the simulated image in a manner that illustrates the direction and speed along the motion path. Path indicator 36 may be an arrow with a highlighting color and having a size proportional to the object velocity, for example.

Figure 9:
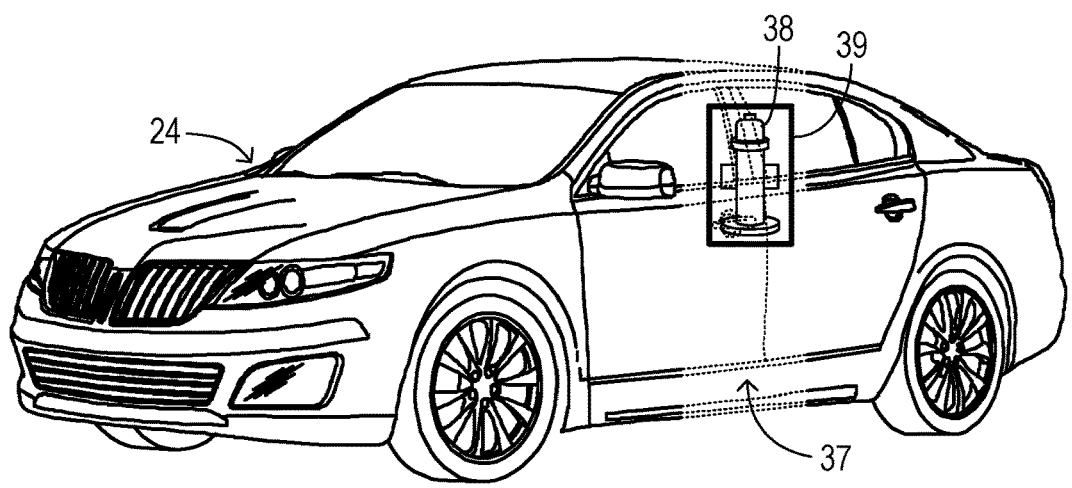
FIG. 9 is another virtual vehicle wherein an object in a transparent zone is surrounded by a highlight frame.
Figure 10:
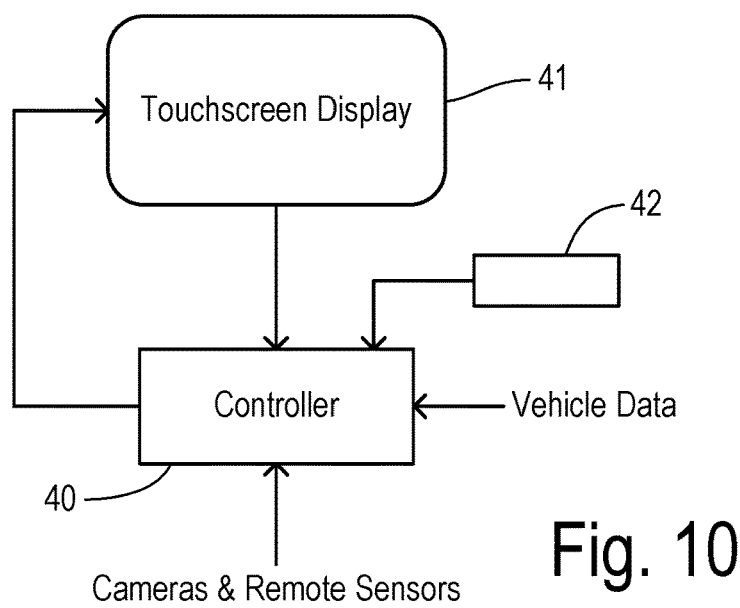
FIG. 10 is a block diagram showing one embodiment of vehicle apparatus for executing the present invention.

The present invention may further provide highlighting of objects of interest that have been unobscured within a transparent bounding zone on the vehicle image whenever the apparent size of the object in the simulated image is particularly small. As shown in FIG. 9, a transparent section 37 on virtual vehicle image 24 is being made transparent to reveal an object of interest 38 (shown as a fire hydrant) wherein the image area occupied by object 38 is small enough that it could escape notice. In order to improve visibility of object 38, a highlight frame 39 is overlain on vehicle image 24 surrounding the image data of object 38. The highlight frame may include a distinguishing bright color, for example. Furthermore, the potential future trajectory of the vehicle based on the current wheel orientation and gear, drive or reverse, may be used to determine objects of interest that are required to be highlighted to the vehicle motion, object motion, or a combination of the two due to risk of collision.

When appropriate (as explained below), a portion of the virtual vehicle image being superimposed on the exterior image data from the cameras is rendered at least partially transparent so that the otherwise obscured object can be seen at its current location, thereby allowing the object to be perceived by the driver in the simulated image. To maintain efficacy of the simulated image and to avoid distraction from objects not representing any sort of real hazard, the addition of a transparent section is only utilized under particular conditions as explained below. In other words, not every detected object will considered an object of interest.

More particularly, detected objects are of interest when there is a potential for an impact with the vehicle to occur. Thus, objects which are far enough away from the vehicle can be ignored since the chances of interaction with the vehicle would be low. According to one preferred embodiment, the objects of interest which are subject to potential impact are comprised of objects that are within a predetermined distance of the vehicle (e.g., about 5 meters). In addition, the vehicle and object motions may be considered and the time to collision calculated. An additional safety envelope around the vehicle may be considered, e.g. where a pedestrian is walking parallel along the vehicle but future collision may occur due to a change in vehicle wheel motion beyond some threshold. Furthermore, objects within the blind spots of a human driver perception may receive additional priority to be highlighted in the virtual camera image.

In addition to a requirement of a certain proximity of an object, a decision to render a section of the virtual vehicle image as transparent can also depend on the proportion of the object which is obscured by the vehicle image compared to the full area of the object. If an object is mostly visible then the simulated image may be more helpful to the driver if the vehicle is not rendered transparent. However, the ratio of hidden object area to full object area to be used in the decision depends upon the type of object under consideration, as described below.

Vehicle apparatus for practicing the invention is shown in FIG. 2, wherein a controller 40 is connected to a touchscreen display 41. Controller 40 may be included in a vehicle body control module (BCM) or any other suitable module within a vehicle electronic system, or can be a stand-alone module, for performing the various functions described herein for simulating an outside view of the vehicle and its environment. Touchscreen display 41 may preferably be comprised of a display panel mounted to a dashboard or instrument panel of the vehicle. Touchscreen display 41 may receive manual input from a user for selecting a viewpoint for a generated simulated image. Additional operator inputs 41 such as pushbutton switches or other operator controls can be used by a driver or other vehicle occupant to specify operation of the surround viewing system. Controller 40 is connected to a camera array and other remote sensors to receive the camera image data and other data relating to sensed objects. Controller 40 connects to a vehicle multiplex bus for receiving various vehicle data such as a steering angle and vehicle speed in order to characterize vehicle motion.

Figures 11, 13:
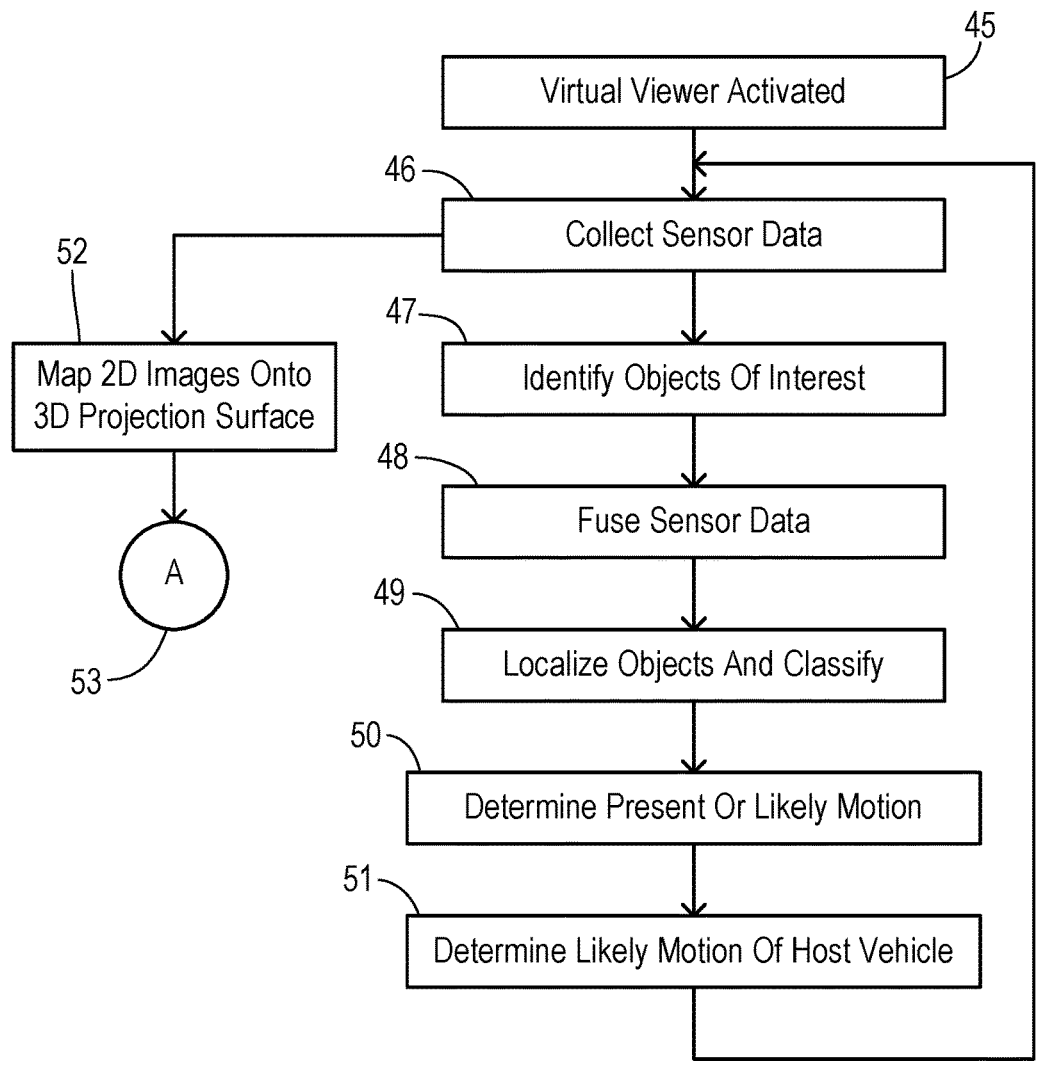
FIG. 11 is a flowchart showing one preferred embodiment for collecting data relating to outward-looking images and nearby objects of interest.
FIG. 13 is a table listing thresholds of the invention according to respective types of objects.

FIG. 11 shows a portion of a preferred method of the invention, wherein image data and object sensing data are collected on a continuous basis. In step 45, the virtual viewer function is activated. Sensor data including outward looking image data from an array of cameras is collected in step 46. While the virtual viewer feature is activated, the invention continuously monitors to direct to detect and identify objects of interest in step 47. The object tracking function may include the fusing of sensor data in step 28 and the localization and classification of objects in step 49. The localization of objects may, for example, determine the distance between the vehicle and the object, so that objects at a distance greater than a predetermined distance may be ignored for purposes of rendering a virtual vehicle image transparent. The classification of objects preferably includes various object types which include a pedestrian object type, a bicycle object type, a motorcycle object type, and a car object type. An object type may also include an extended object such as a curb. The pedestrian object type is preferably further broken down into a separate adult pedestrian type and a child pedestrian type. In step 50, the present motion and likely future motion of the objects of interest are determined, and the present motion and likely future motion of the host vehicle is determined in step 51. A return is made to step 46 for continuously monitoring the nearby objects.

Figure 12:
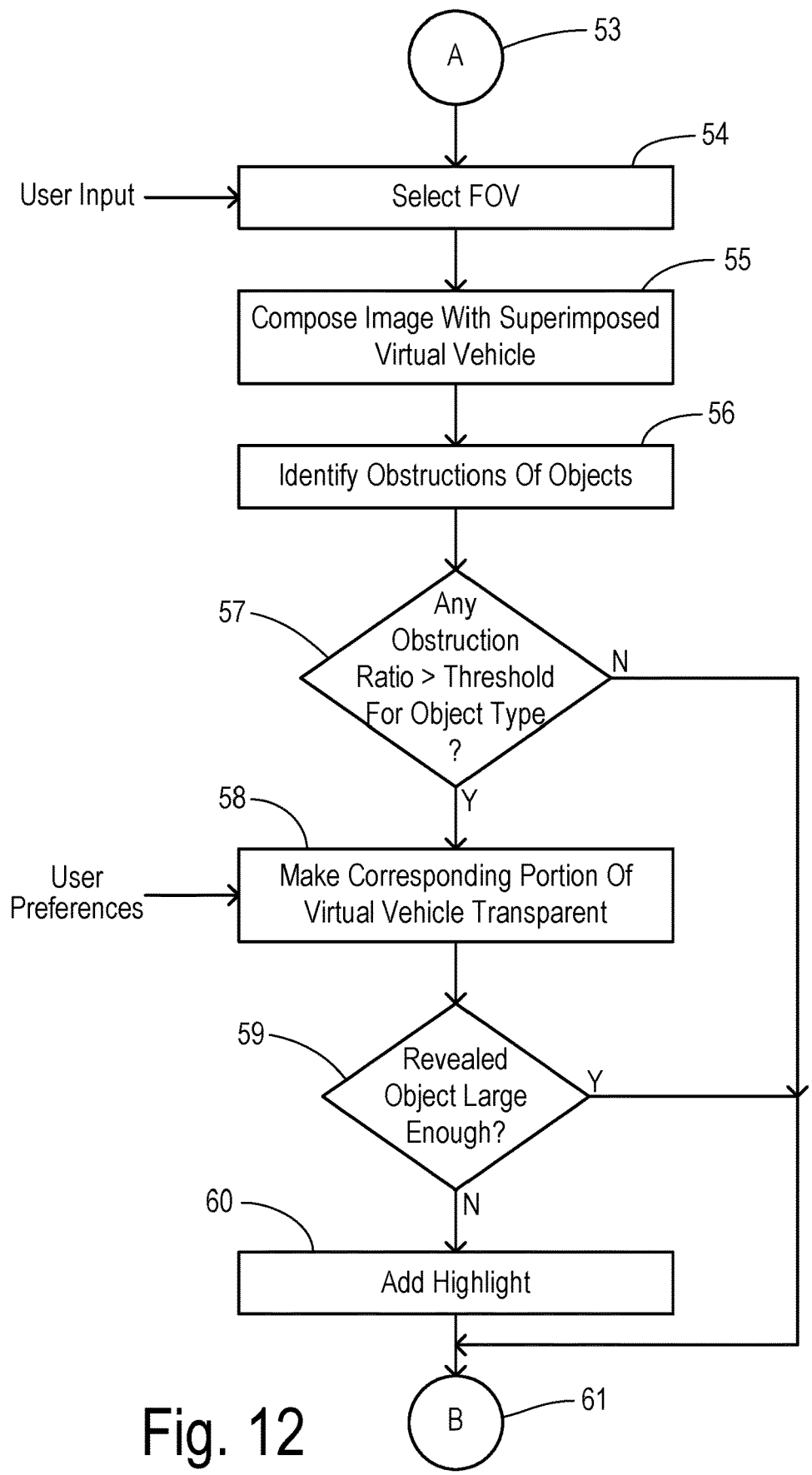
FIG. 12 is a flowchart showing a first portion of one preferred method of the invention.

Using the collected image data, the two-dimensional images from the cameras are mapped onto a three-dimensional projection surface in step 52. The method proceeds to point A (step 53) and proceeds to the method shown in FIG. 12. Based on user input, a desired field of view (FOV) to be used for assembling the simulated image is selected in step 54. The selection is preferably comprised of choosing a vantage point having a particular bearing (i.e., angle with respect to a reference direction) and height (which might be set in advance). The vantage point correspondingly maps onto the imaginary parabolic surface onto which the two-dimensional images have been projected. In step 55, a simulated image is assembled corresponding to the appearance of projected image data as seen from the selected FOV/vantage point and having the virtual vehicle image being superimposed over part of the projected image data.

Any obstructed objects (i.e., at least partially blocked by the virtual vehicle image) are identified in step 56. The identification preferably includes quantifying an "obstruction ratio" for a detected object of interest, wherein the obstruction ratio characterizes a percentage of the object's apparent surface area that is obscured. Quantifying the obstruction ratio can be comprised of generating a plurality of rays (each ray connecting the vantage point with a respective point on a regular grid covering the detected object) and then determining a fraction of the rays which coincide with (i.e., pass through) the virtual vehicle image after it is placed in the simulated image. Alternatively, the quantification of the obstruction ratio can be performed by counting a first number of pixels in the simulated image representing the detected object prior to superimposing virtual vehicle image, then counting a second number of pixels of the detected object which are obscured after superimposing virtual vehicle image, and then dividing the second number by the first number. Rather than just counting the pixels in a pixel-wise semantic segmentation, a more complex analysis can alternatively be used to quantify the obstruction. For example, a weighting function can be used of the type:

$$c_1*pixel\_obstructed*proximity+\\c_2*pixel\_obstructed*relative\_vector+\\c_3*pixel\_obstructed*class\_weighting\_factors+b_1$$

where $c_1$, $c_2$, $c_3$, and $b_1$ are calibratable constants.

In step 57, the obstruction ratio as compared to an obstruction threshold which is assigned according to the object class or type. FIG. 13 shows examples of object classes 62 and corresponding obstruction thresholds 63. Thus, when a detected object is classified as an adult pedestrian, then its obstruction ratio as compared to a threshold of 70%. Similarly, when the object classification type is a child pedestrian, then the obstruction threshold is comprised of a 40% blockage. When the obstruction ratio is less than the obstruction threshold, then the virtual vehicle image is not rendered transparent and the method proceeds to point B (step 61). If the obstruction ratio is greater than the obstruction threshold, then the corresponding portion of the virtual vehicle image is made transparent in step 58 according to user preferences (such as the type or intensity of the transparency).

In step 59, a check is performed to determine whether the image size of the object that has been revealed (unobscured) by the transparency is large enough to be easily discernible. For example, the image size may be determined according to a number of pixels within an outer boundary of the object image (e.g., the entire object and not just the portion coinciding with the transparency). Depending upon the object type, a respective pixel count or pixel area can be used to define a "highlight pixel cut off" 66 as shown in FIG. 13. When the pixel area of the object's image data (as projected into the simulated image) is less than the highlight threshold, then a highlight frame can be overlaid on the simulated image in step 60 surrounding the image data so that the object is more noticeable to the driver. The highlight frame may have a high contrast, bright color to enhance its visibility. From point B, the method proceeds to FIG. 14.

Figure 14:
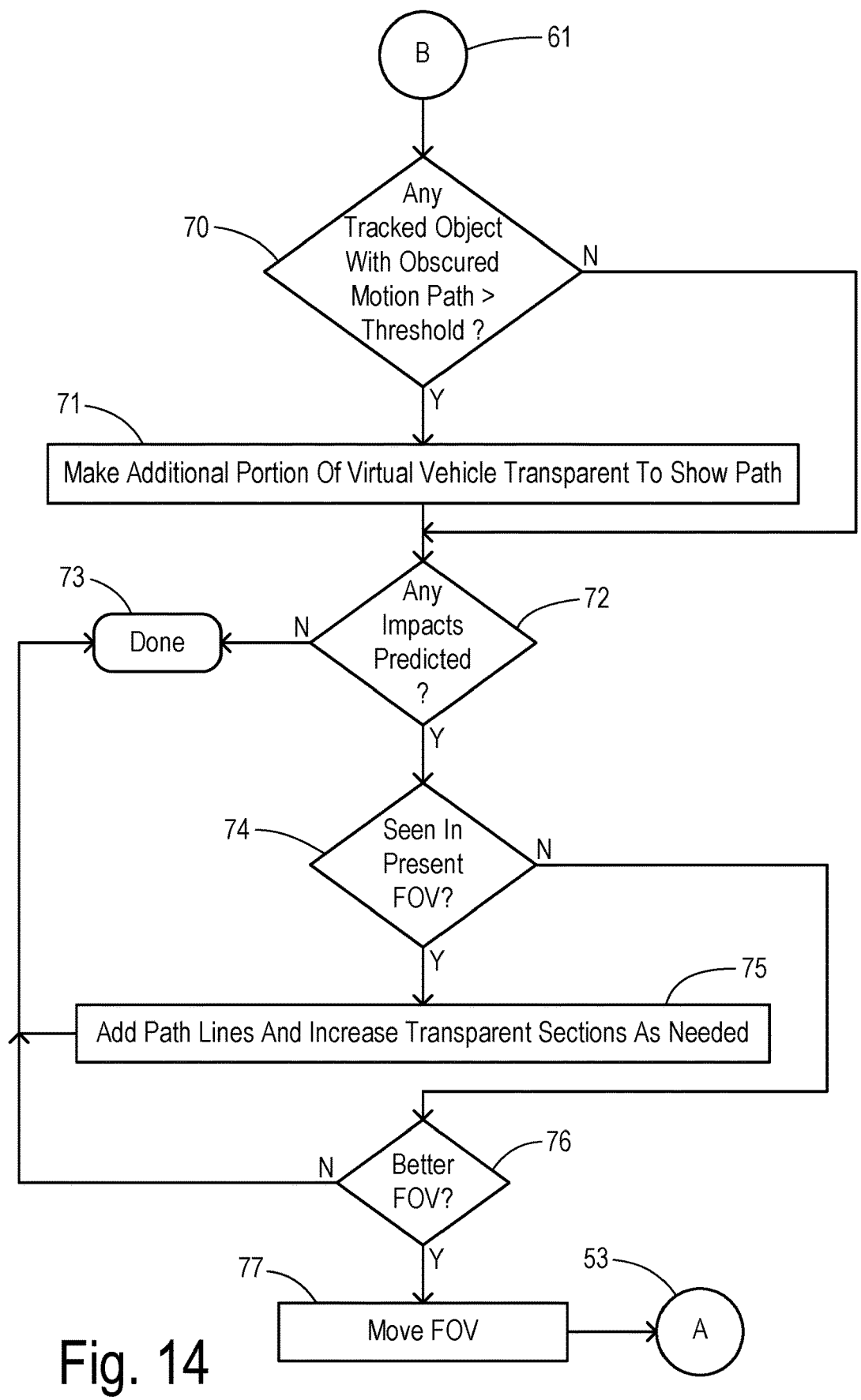
FIG. 14 is a flowchart showing a second portion of the method of FIG. 12.

FIG. 14 shows a portion of the method relating to object motion. Motion of both the detected object and the vehicle may be determined using known technologies and techniques (e.g., sensor fusion, Doppler radar, optical flow, stereo cameras, or monocular depth CNN). For example, active sensors may directly measure relative motion. In addition, vehicle data such as steering angle, wheel rotation, and gear selection may be used to predict upcoming movement. Based on the motion of the object and/or the host vehicle, a motion path for a respective object can be predicted according to how such path would be seen in the simulated image over a predetermined period of time, for example. A check is performed in step 70 to determine whether any tracked object has an obscured motion path with a size greater than a predetermined motion threshold (e.g., corresponding to over a certain span of pixels in the simulated image). Based on the apparent length of the motion path in the simulated image, an additional portion of the virtual vehicle image may be made transparent in step 71 in order to show the motion path. In addition, a path indicator such as a path line or arrow is overlaid on the simulated image corresponding to the motion path so that the driver can easily ascertain where the object is headed. Preferably, the path indicator may be overlain within an expanded bounding zone which has been made transparent to unobscure the motion path. More particularly, an image size of the unobscured motion path is preferably determined which corresponds to a predicted position of the detected object after a predetermined time. Furthermore, the predetermined time may have a value which is selected according to the classified object type as shown in column 64 of FIG. 13. For example, when the object type is a child pedestrian, then the image size of the motion path to be considered corresponds to the travel distance achieved after 6 seconds of motion, while the image size of a motion path for a nearby car corresponds to the travel distance after 3 seconds of motion.

In step 72, a determination is made whether any actual impacts are predicted based on the current motion or most highly likely future motion and the time until collision. If no impacts are predicted then the method ends at step 73. If an impact is expected, then a check is performed in step 74 to determine whether the impact would occur at a spot that can be seen within the present field of view. If so then path lines leading to the impact are preferably overlaid on the image in step 75, and the transparent sections of the virtual vehicle image can be increased if needed. When the impact would not be seen in the present field of view, then a check is performed in step 76 to determine whether a better field of view is available/desirable.

The test for detecting whether a better field of view is available may preferably include an assessment of the actual probability that an impact may occur. This probability is multiplied by an "importance factor" for shifting the field of view as shown in column 65 of FIG. 13. If the probability of impact multiplied by the importance factor is greater than a predetermined threshold, then the vantage point is be adjusted to an alternate location on the imaginary parabolic surface for which the obstruction ratio of the impact and the object of interest are reduced. If a better field of view is available, then the selected field of view is moved in step 77 and the method returns to point A. If not, then the method ends at step 73.

What is claimed is:

1. A method of displaying a visual scene around a vehicle to an occupant of the vehicle, comprising:
    assembling a simulated image corresponding to a selected vantage point on an imaginary parabolic surface outside the vehicle from exterior image data and a virtual vehicle image superimposed on and obscuring a corresponding part of the image data;
    detecting objects of interest at respective locations around the vehicle subject to potential impact;
    for a detected object having image data obscured by the virtual vehicle image, quantifying an obstruction ratio according to a proportion of an area of the detected object which is obscured compared to a full area of the detected object;
    when the detected object has an obstruction ratio above an obstruction threshold, rendering a corresponding bounding zone of the virtual vehicle image at least partially transparent in the simulated image to unobscure the corresponding image data.

2. The method of claim 1 wherein the objects of interest subject to potential impact are comprised of objects within a predetermined distance from the vehicle.

3. The method of claim 1 wherein the step of quantifying the obstruction ratio is comprised of:
    counting a first number of pixels in the simulated image representing the detected object prior to superimposing the virtual vehicle image;
    counting a second number of pixels of the detected object which are obscured after superimposing the virtual vehicle image; and
    dividing the second number by the first number.

4. The method of claim 1 wherein the step of quantifying the obstruction ratio is comprised of:
    generating a plurality of rays between the vantage point and the detected object; and
    determining a fraction of the rays which coincide with the vehicle image in the simulated image.

5. The method of claim 1 further comprising the step of:
    classifying the detected object according to a plurality of object types which include a pedestrian object;
    wherein the obstruction threshold is selected according to the classified object type.

6. The method of claim 5 wherein the object types include a larger pedestrian and a smaller pedestrian, and wherein the obstruction threshold selected for the smaller pedestrian has a first value lower than a second value for the larger pedestrian.

7. The method of claim 1 further comprising the steps of:
    determining a pixel area of image data in the simulated image corresponding to the detected object; and
    overlaying a highlight frame surrounding the image data of the detected object if the pixel area is less than a highlight threshold.

8. The method of claim 7 further comprising the step of:
    classifying the detected object according to a plurality of object types which include a pedestrian object;
    wherein the highlight threshold has a value selected according to the classified object type.

9. The method of claim 1 further comprising the steps of:
    determining relative motion between the detected object and the vehicle;
    comparing the relative motion to a motion threshold;
    when the relative motion is greater than the motion threshold then expanding the bounding zone to unobscure a motion path of the detected object.

10. The method of claim 9 further comprising the step of overlaying a path indicator on the simulated image corresponding to the motion path.

11. The method of claim 9 wherein an image size of the unobscured motion path corresponds to a predicted position of the detected object after a predetermined time, wherein the predetermined time has a value selected according to the classified object type.

12. The method of claim 9 further comprising the steps of:
    detecting a probability of impact between the detected object and the vehicle;
    multiplying the impact probability with an importance factor associated with the classified object type; and
    adjusting the vantage point to an alternate location on the imaginary parabolic surface for which the obstruction ratio of the detected object is reduced.

13. Vehicle apparatus comprising:
    an array of cameras mounted to a vehicle providing exterior image data surrounding the vehicle;
    a display panel for displaying a visual scene around a vehicle to an occupant of the vehicle; and
    a controller adapted to:
        assemble a simulated image corresponding to a selected vantage point on an imaginary parabolic surface outside the vehicle from the exterior image data and a virtual vehicle image superimposed on and obscuring a corresponding part of the image data;
        detect objects at respective locations around the vehicle;
        for a detected object having image data obscured by the virtual vehicle image, quantify an obstruction ratio according to a proportion of an area of the detected object which is obscured compared to a full area of the detected object; and
        render a corresponding bounding zone of the vehicle image at least partially transparent in the simulated image to unobscure the corresponding image data when the detected object has an obstruction ratio above an obstruction threshold.

14. The vehicle apparatus of claim 13 further comprising a plurality of active remote sensors providing sensor data for detecting and classifying the detected object.

15. The vehicle apparatus of claim 13 wherein the controller quantifies the obstruction ratio by counting a first number of pixels in the simulated image representing the detected object prior to superimposing the virtual vehicle image, counting a second number of pixels of the detected object which are obscured after superimposing the virtual vehicle image, and dividing the second number by the first number.

16. The vehicle apparatus of claim 13 wherein the controller classifies objects of interest within a predetermined distance from the vehicle, wherein the detected objects of interest are classified according to a plurality of object types which include a pedestrian object, and wherein the obstruction threshold is selected according to the classified object type.

17. The vehicle apparatus of claim 16 wherein the object types include a larger pedestrian and a smaller pedestrian, and wherein the obstruction threshold selected for the smaller pedestrian has a first value lower than a second value for the larger pedestrian.

18. The vehicle apparatus of claim 13 wherein the controller determines a pixel area of image data in the simulated image corresponding to the detected object, and wherein the controller overlays a highlight frame surrounding the image data of the detected object if the pixel area is less than a highlight threshold;

wherein the controller classifies the detected object according to a plurality of object types which include a pedestrian object, and wherein the highlight threshold has a value selected according to the classified object type.

19. The vehicle apparatus of claim 13:
wherein the controller determines relative motion between the detected object and the vehicle;
wherein the controller compares the relative motion to a motion threshold; and
when the relative motion is greater than the motion threshold then the controller expands the bounding zone to unobscure a motion path of the detected object and overlays a path indicator on the simulated image corresponding to the motion path, wherein an image size of the unobscured motion path corresponds to a predicted position of the detected object after a predetermined time, and wherein the predetermined time has a value selected according to the classified object type.

20. The vehicle apparatus of claim 19 wherein the controller:
detects a probability of impact between the detected object and the vehicle;
multiplies the impact probability with an importance factor associated with the classified object type; and
adjusts the vantage point to an alternate location on the imaginary parabolic surface for which the obstruction ratio of the detected object is reduced.

* * * * *